United States Patent [19]

Ledebuhr

[11] Patent Number: 5,170,250
[45] Date of Patent: Dec. 8, 1992

[54] FULL-COLOR LIGHT VALVE PROJECTION APPARATUS HAVING INTERNAL IMAGE REGISTRATION SYSTEM

[75] Inventor: Arno G. Ledebuhr, Pleasanton, Calif.

[73] Assignee: Hughes Aircraft Company, Los Angeles, Calif.

[21] Appl. No.: 651,672

[22] Filed: Feb. 6, 1991

[51] Int. Cl.⁵ .............................................. H04N 9/31
[52] U.S. Cl. ....................................... 358/60; 353/38
[58] Field of Search ....................... 358/60, 64, 66, 67, 358/69; 353/33, 38, 122; 359/63, 66

[56] References Cited

U.S. PATENT DOCUMENTS

| | | | |
|---|---|---|---|
| 4,085,425 | 4/1978 | Hamill | 358/237 |
| 4,432,011 | 2/1984 | Lehnert | 358/60 |
| 4,648,695 | 3/1987 | Mizutani et al. | 353/38 |
| 4,683,467 | 1/1987 | Macaulay et al. | 340/705 |
| 4,818,098 | 4/1989 | Kahn et al. | 353/38 |
| 4,983,032 | 1/1991 | Van Den Brandt | 358/60 |

FOREIGN PATENT DOCUMENTS 56-35581 4/1981 Japan .

Primary Examiner—Edward L. Coles, Sr.
Assistant Examiner—Kim Yen Vu
Attorney, Agent, or Firm—Wanda K. Denson-Low

[57] ABSTRACT

A projection apparatus 30 with internal image registration is disclosed herein. The projection apparatus 30 of the present invention includes a light valve arrangement 58, 60, 52 for providing an image beam and an alignment beam, with the alignment beam having a predetermined spatial relationship with the image beam. The image beam is projected onto an external screen 20 by a projection lens 46. The present invention further includes a photodetector assembly 46, 48, 50 for generating a control signal in response to the position of the alignment beam. The image beam is aligned with the projection lens 46 by a light valve control circuit responsive to the control signal.

17 Claims, 4 Drawing Sheets

FULL-COLOR LIGHT VALVE PROJECTION APPARATUS HAVING INTERNAL IMAGE REGISTRATION SYSTEM

BACKGROUND OF THE INVENTION

1. Field of the Invention

The present invention relates to image projection systems. More specifically, the present invention relates to projection systems utilizing light valves for generation of an image beam.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Certain full-color projector systems used in real-time imaging applications include a projector apparatus for generating three separate primary color image beams. The beams converge within the projector at the back plane of a wide angle projection lens, which then projects the resulting composite image onto an external projection screen. Each primary color image is generally produced by an optical light valve driven by a cathode ray tube, and is forwarded to the wide angle projection lens via an optical lens relay system.

In order that the composite image displayed on the external screen be suitable for viewing, it is necessary that each of the individual primary color images be in registration (optical alignment). In conventional projector systems, a set of three position sensitive photodetectors is mounted on or near the external screen for the purpose of detecting the position on the screen of each projected primary color image. The projector apparatus illuminates each of the photodetectors with a target image which is substantially optically coincident with one of the primary color images. The screen position of each primary color image can then be adjusted in response to control signals from the photodetectors which indicate the screen position of the target image associated therewith.

Unfortunately, conventional image registration systems using screen mounted detectors suffer from a number of drawbacks. For example, installation of such a system requires precise alignment of the screen detectors relative to the projector apparatus. This requirement often compels the utilization of a precision alignment mechanism which may increase manufacturing costs. Moreover, the connection cables which link the screen detectors with the projector apparatus may hinder the implementation of the projection system in certain applications, and may also increase production costs.

In addition, the magnification of the target images incident on the photodetectors varies with the size of the projection screen. Accordingly, more than one set of photodetectors may need to be employed to cover the complete range of projected image sizes. Moreover, when ambient light levels remain unchanged in the face of target image intensity changes due to modifications in screen size, the signal to noise ratio of the target image illuminating each photodetector is altered. This change in signal to noise ratio complicates the processing of the control signals generated by the photodetectors.

A perhaps more serious concern, however, arises in connection with the application of color projector systems in ships, planes or other moving vehicles. In these rugged environments there may be flexing between the surface on which the projector apparatus is mounted and the surface of the external projection screen. As the projector moves relative to the screen the photodetectors on the screen sense a misregistration of the projected images, and issue control signals instructing the projector to center each primary color image on its associated detector. However, this temporary screen flexing has given rise to only an "apparent" misregistration. That is, the relative motion between the projector and the screen does not cause a misregistration of the primary color images at the back plane of the wide angle projection lens within the projector. It follows that the control signals emitted by the photodetectors subsequent to relative motion between the projector and screen may induce a "real" misregistration of the primary color images at the wide angle projection lens. The resulting degradation of the composite image displayed on the screen will then depend on the size and frequency of the perturbations in the relative displacement of the projector and screen.

Accordingly, a need in the art exists for a projection system having an image registration system which is relatively unaffected by temporary variations in the relative displacement between a projector apparatus and external screen.

SUMMARY OF THE INVENTION

The need in the art for a projection system having an image registration mechanism relatively impervious to temporary variation in the position of an external screen is addressed by the internally registered light valve projection apparatus of the present invention. The projection apparatus of the present invention includes a light valve arrangement for providing an image beam and an alignment beam, with the alignment beam having a predetermined spatial relationship with the image beam. The image beam is projected onto an external screen by a projection lens. The present invention further includes a photodetector for generating a control signal in response to the position of the alignment beam. The image beam is aligned with the projection lens by a light valve control circuit responsive to the control signal.

DETAILED DESCRIPTION OF THE INVENTION

Figure 1:
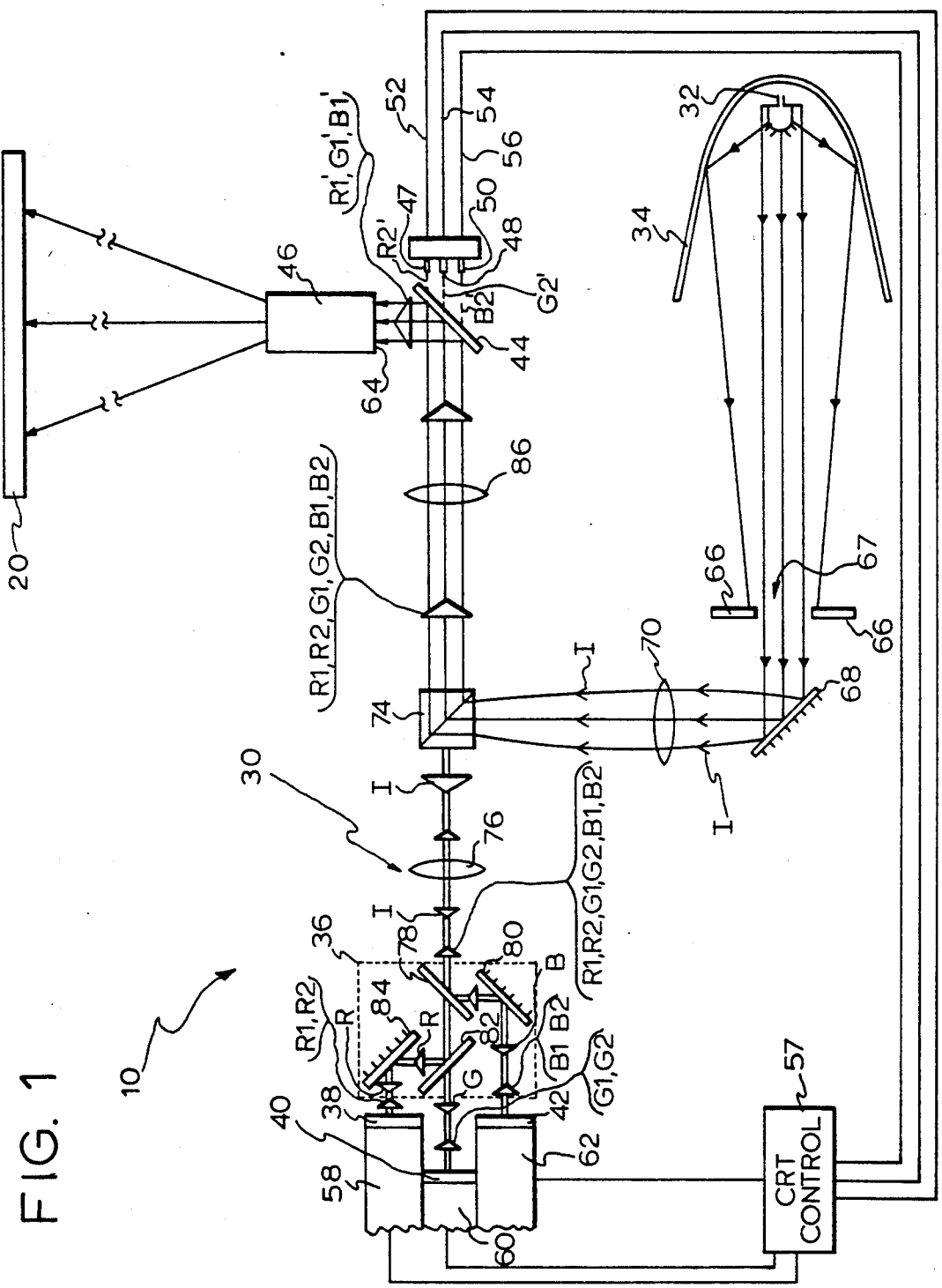
FIG. 1 is a block diagram of a full-color projection system.

FIG. 1 is a block diagrammatic representation of a full-color projection system 10. The system 10 includes a projection screen 20 and the inventive light valve projection apparatus with automatic internal primary color image registration 30. As is discussed more fully below, an illumination beam I is generated within the apparatus 30 of the present invention by an arc lamp 32 and reflector 34. The beam I is separated into red (R), green (G) and blue (B) light valve read-out beams by a beam separation arrangement 36. The red, green and blue read-out beams illuminate first, second and third light valves 38, 40, 42 thereby generating red, green and blue image beams R1, G1, B1 and red, green and blue alignment beams R2, G2 and B2. The red, green and blue image beams R1, G1, B1 and red, green and blue alignment beams R2, G2, B2 are then polarized upon passing through a polarizing prism 74.

First portions R1', G1', B1' of the image beams R1, G1, B1 are reflected by a substantially reflective fold mirror 44 to a wide angle projection lens 46 and projected on the screen 20. Second portions R2', G2', B2' of the alignment beams R2, G2, B2 pass through the mirror 44 and illuminate first, second and third position sensitive photodetectors 46, 48, 50. The first, second and third photodetectors 46, 48, 50 generate first, second and third control signals carried by first second and third signal lines 52, 54, 56 in response to the positions of the second portions of the alignment beams R2', G2', B2'. The first, second and third control signals drive control circuitry 57 associated with first, second and third cathode ray tubes 58, 60, 62 such that the first portions of the red, green and blue image beams R1', R1', G1' are put in optical registration at the back plane 64 of the projection lens 46. In this manner the apparatus 30 of the present invention is operative to place three primary color images in optical registration without utilizing external screen mounted detectors.

As shown in FIG. 1, light emitted by the arc lamp 32 and reflector 34 impinge on an illumination aperture element 66. The aperture element 66 defines an illumination aperture 67. The light passing through the illumination aperture 67 forms the illumination beam I. The illumination beam I is next reflected by a first planar mirror 68 to a first illumination relay lens 70. The relay lens 70, collimates the beam I and relays it to the polarizing prism 74. The prism 74 directs the beam I to a dual purpose illumination/projection relay lens 76. The lens 76 relays the illumination beam I to the beam separation arrangement 36.

Within the beam separation arrangement 36 the illumination beam I is initially incident on a blue reflector filter 78. The blue filter 78 redirects that portion of the beam I within the "blue" region of the visible light spectrum to a second planar mirror 80, thereby forming the blue read-out beam B. Similarly, the remainder of the illumination beam I illuminates a red reflector filter 82 which redirects that portion of the remainder of the beam I within the "red" region of the visible light spectrum to a third planar mirror 84, thereby forming the red read-out beam (R). The remainder of the beam I, which includes light within the "green" portion of the visible light spectrum is transmitted by the red filter 82 to form the green read-out beam (G).

As mentioned above, the red, green and blue read-out beams R, G, B impinge on first, second and third light valves 38, 40, 42. The light valves 38, 40, 42 each include a liquid crystal layer for modulating the respective read-out beams in order to generate the red image and alignment beams R1, R2, the green image and alignment beams G1, G2 and the blue image and alignment beams B1, B2. In the embodiment of FIG. 1, like color image and alignment beams are projected by the light valves 38, 40, 42 in substantially parallel directions. The light valves 38, 40, 42 are conventionally coupled to first, second and third cathode ray tubes 58, 60, 62. The cathode ray tubes 58, 60, 62 scan the light valves 38, 40, 42 with electron beam patterns corresponding to the image and alignment beam generated thereby. The patterns giving rise to the alignment beams are periodically updated by the cathode ray tubes between successive light valve scans.

As is shown in FIG. 1, the red image and alignment beams R1, R2 engendered by the first light valve 58 are redirected by the third planar mirror 84 to the red reflector filter 82. The red filter 82 then reflects the red image and alignment beams R1, R2 to the dual purpose lens 76. Similarly, the blue image and alignment beams B1, B2 produced by third light valve 62 are redirected by the second planar mirror 80 to the blue reflector filter 78. The blue filter 78 then reflects the blue image and alignment beams B1, B2 to the dual purpose lens 76. The green image and alignment beams G1, G2 pass through the red and blue reflector filters 82, 78 to the lens 76. Next, the dual purpose lens 76 relays the image and alignment beams R1, G1, B1, R2, G2, B2 to the polarizing prism 74. The prism 74 polarizes the image and alignment beams R1, G1, B1, R2, G2, B2 and sends them to a projection relay lens 86. The optical parameters of the relay lens 86, are chosen such that the image and alignment beams R1, G1, B1, R2, G2, B2 illuminate the back plane 64 of the wide angle projection lens 46 following partial reflection by the fold mirror 44.

Figure 2:
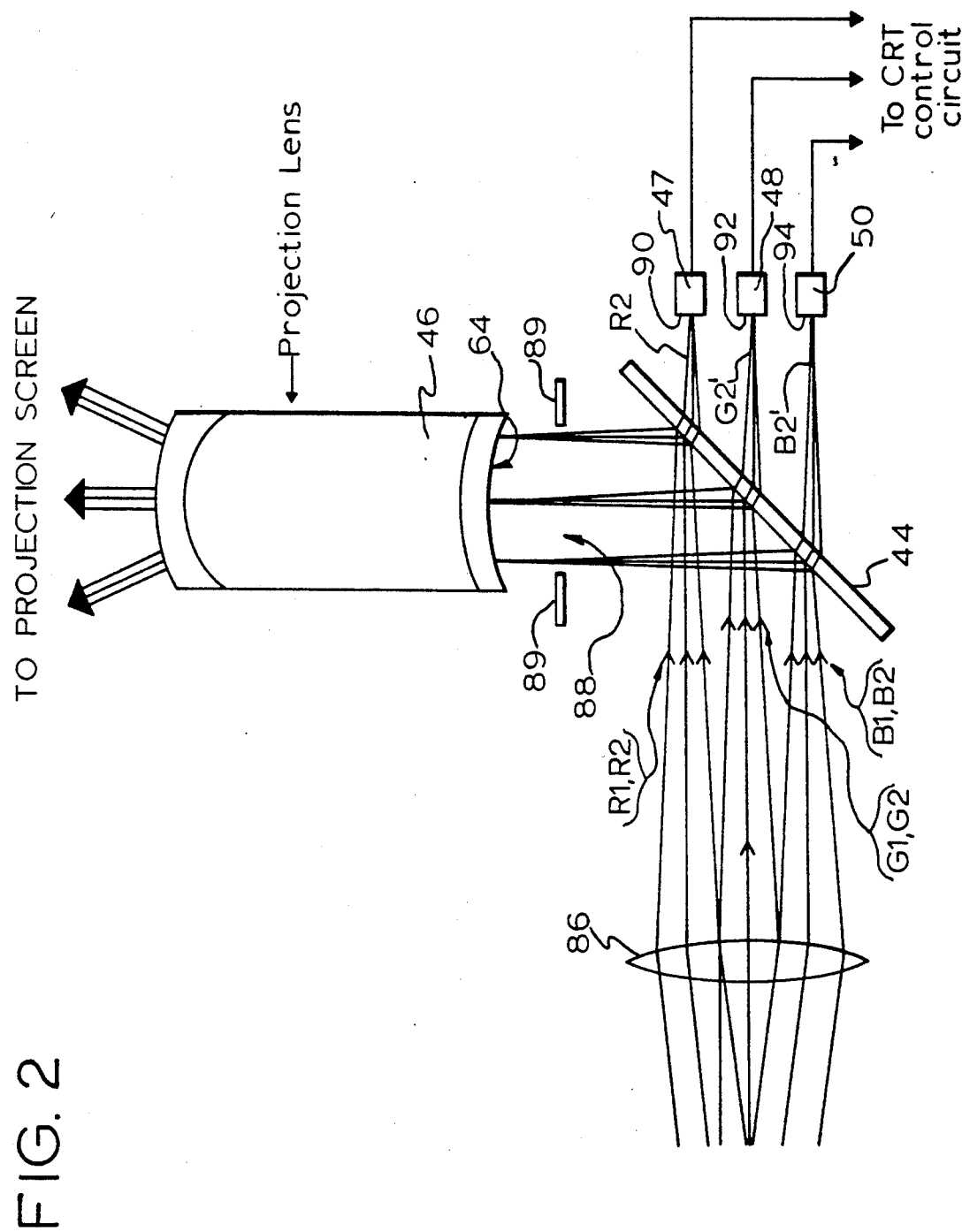
FIG. 2 is a magnified block diagram of a portion of the projection apparatus of the present invention showing with greater specificity the partial reflection effected by the fold mirror.

The magnified block diagrammatic view of FIG. 2 shows with greater specificity the partial reflection effected by the fold mirror 44. In the embodiment of FIGS. 1, 2 the fold mirror 44 is approximately 98% reflective, with approximately 2% of the light of each of the red, green and blue alignment beams R2, G2, B2 passing through the fold mirror 44 as the beams R2', G2', B2'. Similarly, 98% of the light from the red, green and blue image beams R1, G1 and B1 is reflected by the fold mirror 44 to form the beams R1', G1', B1'. The beams R1', G1', B1' then pass through a projection aperture 88, defined by an aperture element 89, and are incident on the wide angle projection lens 46. The beams R2', G2', B2' are made to impinge upon the photodetectors 46, 48, 50 by adjusting the positions thereof in conjunction with selecting the optical parameters of the dual purpose lens 76, the prism 74 and the projection relay lens 86.

The beams R2', G2', B2' are incident on faces 90, 92, 94 of the position sensitive photodetectors 46, 48, 50. Each of the faces 90, 92, 94 is bisected by horizontal and vertical axes (not shown) thereby forming four quadrants of equal area on each face. Each photodetector generates four detection signals, with each signal being proportional to the intensity of the portion of the alignment beam illuminating one of the four axis segments emanating from the origin. The difference of the two signals on the horizontal axis yields the horizontal center of illumination of the incident alignment beam with respect to the face of the photodetector. By dividing this difference by the sum of the two signals from the horizontal axis, the horizontal center of illumination is made independent of changes in illumination levels. This process is then repeated for the vertical axis. In this manner the positions of the alignment beams relative to the photodetectors 46, 48, 50 are determined. Conventional signal processing electronics then generate the first, second and third control signals on the signal lines 52, 54, 56 in response to the positions of the alignment beams R2', B2', G2'.

Figure 3:
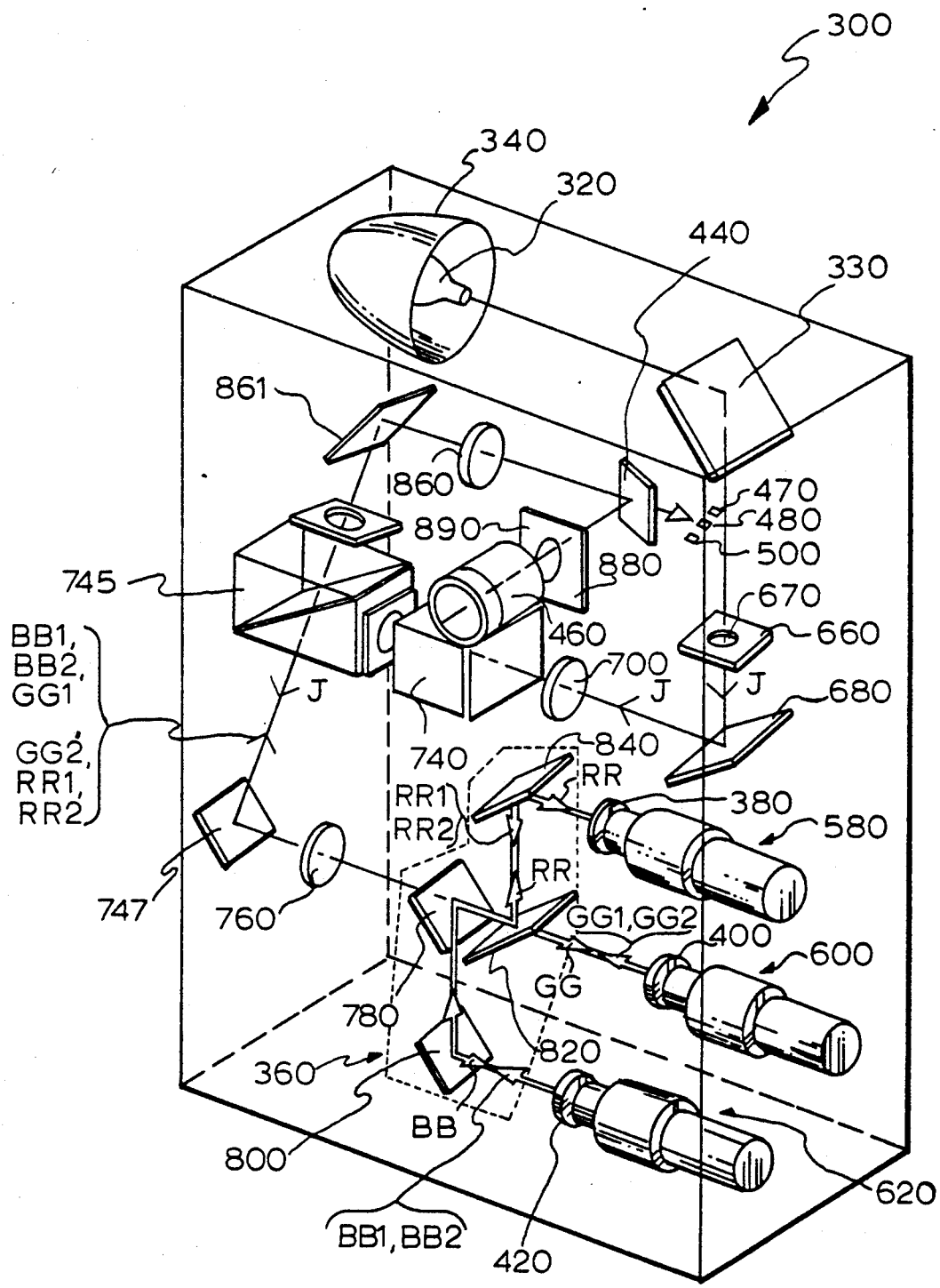
FIG. 3 represents a particular physical implementation of the block diagram of the inventive light valve projection apparatus of FIG. 1.

FIG. 3 illustratively represents a particular physical implementation 300 of the block diagram of the inventive light valve projection apparatus 30 shown in FIG. 1. As shown in FIG. 3, light emitted by an arc lamp 320 and reflector 340 is reflected by an illumination mirror 330 and impinges on an illumination aperture element 660. The aperture element 660 defines an illumination aperture 670. The light passing through the illumination aperture 670 forms an illumination beam J. The illumination beam J is next reflected by a first planar mirror 680 to a first illumination relay lens 70. The relay lens 70 collimates the beam J and relays it to a first prism 740. The prism 740, together with a polarizing prism 745 and prism mirror 747, direct the beam J to a dual purpose illumination/projection relay lens 760. The lens 760 relays the illumination beam J to a beam separation arrangement 360.

Again, within the beam separation arrangement 360 the illumination beam J is initially incident on a blue reflector filter 780. The blue filter 780 redirects that portion of the beam J within the "blue" region of the visible light spectrum to a second planar mirror 800, thereby forming a blue read-out beam BB. Similarly, the remainder of the illumination beam J illuminates a red reflector filter 820 which redirects that portion of the remainder of the beam J within the "red" region of the visible light spectrum to a third planar mirror 840, thereby forming a red read-out beam RR. The remaining portion of the beam J, included within the "green" portion of the visible light spectrum is transmitted by the red filter 820 to form a green read-out beam GG.

The red, green and blue read-out beams RR, GG, BB impinge on first, second and third light valves 380, 400, 420. The light valves 380, 400, 420 each include a liquid crystal layer for modulating the respective read-out beams in order to generate red image and alignment beams RR1, RR2, green image and alignment beams GG1, GG2 and blue image and alignment beams BB1, BB2. In the embodiment of FIG. 3, like color image and alignment beams are projected by the light valves 380, 400, 420 in substantially parallel directions. The light valves 380, 400, 420 are conventionally coupled to first, second and third cathode ray tubes 580, 600, 620. The cathode ray tubes 580, 600, 620 scan the light valves 380, 400, 420 with electron beam patterns which correspond to the image and alignment beam generated thereby. The patterns giving rise to the alignment beams are periodically updated by the cathode ray tubes between successive light valve scans.

As is shown in FIG. 1, the red image and alignment beams RR1, RR2 engendered by the first light valve 580 are redirected by the third planar mirror 840 to the red reflector filter 820. The red filter 820 then reflects the red image and alignment beams RR1, RR2 to the dual purpose lens 760. Similarly, the blue image and alignment beams BB1, BB2 produced by third light valve 620 are redirected by the second planar mirror 800 to the blue reflector filter 780. The blue filter 780 then reflects the blue image and alignment beams BB1, BB2 to the dual purpose lens 760. The green image and alignment beams GG1, GG2 pass through the red and blue reflector filters 820, 780 to the lens 760. Next, the dual purpose lens 760 relays the image and alignment beams RR1, GG1, BB1, RR2, GG2, BB2 to the polarizing prism 745. The prism 745 polarizes the image and alignment beams RR1, GG1, BB1, RR2, GG2, BB2 and sends them to a projection relay lens 860 via a second prism mirror 861. A fold mirror 440 substantially redirects the image beams RR1, GG1, BB1 through a projection aperture 880—defined by an aperture element 890—to the back plane of a wide angle projection lens 460. The lens 460 then projects the beams RR1, GG1, BB1 to a projection screen (not shown).

Again, the fold mirror 440 is approximately 98% reflective, with approximately 2% of the light of each of the red, green and blue alignment beams RR2, GG2, BB2 passing through the fold mirror 440 to illuminate first, second and third photodetectors 460, 480, 500. Similarly, 98% of the light from the red, green and blue image beams R1, G1 and B1 is reflected by the fold mirror 440 to form red, green and blue image beams RR1', GG1', BB1'. The beams RR1', GG1', BB1' are then incident on the wide angle projection lens 460, which projects the resultant full-color image to a screen (not shown).

In an alternative embodiment of the inventive light valve projection apparatus a single position sensitive photodetector is substituted for the first, second and third photodetectors 46, 48, 50 (see FIG. 2). Red, green and blue alignment beam are focused upon the single photodetector, but are generated sequentially such that only one alignment beam impinges upon the photodetector at any given time. A microprocessor, coupled both to the output of the photodetector and to cathode ray tube control circuitry, may be used to initiate the generation and identification of the tricolor sequence of alignment beam pulses. In certain applications the slight delay between alignment pulses of like color may enhance the response of the system to transient effects such as momentary image loss. That is, the longer time constant of the single photodetector system engenders a slower response to spurious interference, and hence induces less slewing of the projected image.

Figure 4:
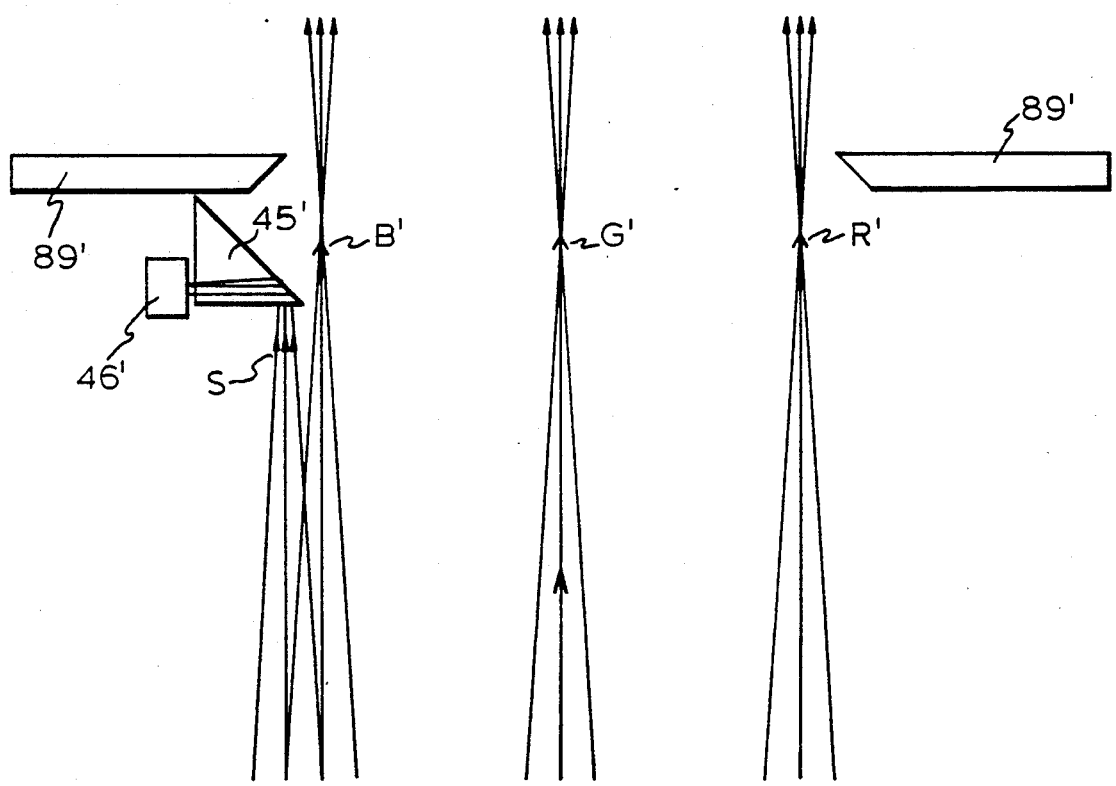
FIG. 4 shows a portion of an alternative embodiment of the present invention wherein the photodetector is positioned adjacent to the projection aperture.

This alternative embodiment of the projection apparatus of the present invention may be modified as shown in FIG. 4. In the embodiment of FIG. 4 red, green and blue image beams R', G', B' are focused upon an image plane defined by an aperture element 89' prior to illuminating a wide angle projection lens (not shown). A tricolor sequence of alignment beam pulses S (generated as described above) is directed by a fold prism 45' to a single position sensitive photodetector 46'. The photodetector 46' is positioned in an optical plane equivalent to that defined by the projection aperture 89'. This positioning of the fold prism 45' and photodetector 46' enables the alignment pulse sequence S to be transmitted at maximum intensity, since none of the pulse sequence is incident upon the projection lens and subsequently displayed upon a projection screen.

Thus the present invention has been described with reference to a particular embodiment in connection with a particular application. Those having ordinary skill in the art and access to the teachings of the present invention will recognize additional modifications and applications within the scope thereof. For example, the teachings of the present invention may be employed in single light valve systems to align the image beam rather than to maintain optical registration among image beams of different color. In addition, a multicolor set of image beams may be generated by optical configurations other than those shown in FIG. 1 without departing from the scope of the present invention.

Similarly, the present invention is not limited to the physical realizations of the fold mirror 44 disclosed herein. For example, the fold mirror may be bifurcated into completely transmissive and reflective sections. In this arrangement the alignment beams would be directed so as to pass through the transmissive section to the photodetectors and the image beams would be entirely reflected by the reflective sections to the projection lens. Alternatively, the fold mirror could be shaped such that the alignment beams do not impinge thereon at all, and instead proceed directly to the photodetectors. In this latter variation only the image beams would be reflected to the wide angle projection lens.

It is therefore contemplated by the appended claims to cover any and all such modifications.

Accordingly,
What is claimed is:

1. A light valve projection apparatus with internal image registration, said apparatus having a projection screen appurtenant thereto, comprising:
   light valve means for providing an image beam and an alignment beam, said alignment beam having a predetermined spatial relationship with said image beam;
   projection lens means for projecting said image beam onto said projection screen;
   photodetector means for generating a control signal in response to the position of said alignment beam; and
   light valve control circuit means for optically aligning said image beam with said projection lens in response to said control signal.

2. The projection apparatus of claim 1 wherein said photodetector means includes a photodetector and wherein said projection apparatus further includes a substantially reflective fold mirror for directing first portions of said image beam and said alignment beam to said projection lens, and for transmitting a second portion of said alignment beam to said photodetector.

3. The projection apparatus of claim 1 wherein said photodetector means includes a photodetector and wherein said projection apparatus further includes a bifurcated fold mirror having a first reflective portion and a second transmissive portion, said image beam being in optical alignment with said first reflective portion and said alignment beam being in optical alignment with said second transmissive portion and said photodetector.

4. A full-color light valve projection apparatus with internal image registration, said apparatus having a projection screen appurtenant thereto, comprising:
   tricolor light valve means for providing red, green and blue image beams and red, green and blue alignment beams wherein said red, green and blue image beams are spatially positioned relative to said red, green and blue alignment beams, respectively, in a predetermined manner;
   projection lens means for projecting said red, green and blue image beams onto said projection screen;
   photodetector means for generating first, second and third control signals in response to the position of said red, green and blue alignment beams, respectively; and
   light valve control circuit means for optically aligning said red, green and blue image beams with said projection lens in response to said control signals.

5. The projection apparatus of claim 4 further including a reflective fold mirror for directing said red, green and blue image beams to said projection lens.

6. The projection apparatus of claim 4 further including a bifurcated fold mirror having a reflective portion in optical alignment with said red, green and blue image beams and a transmissive portion in optical alignment with said red, green and blue alignment beams.

7. The projection apparatus of claim 6 wherein said photodetector means includes first, second and third photodetectors for generating said first, second and third control signals, said first, second and third photodetectors being substantially in optical alignment with said red, green and blue alignment beams, respectively.

8. The projection apparatus of claim 4 wherein said photodetector means includes first, second and third photodetectors, and wherein said projection apparatus further includes a substantially reflective fold mirror for reflecting first portions of each of said image and alignment beams to said projection lens, and for transmitting second portions of said red, green and blue alignment beams to said first, second and third photodetectors, respectively.

9. A full-color light valve projection apparatus with internal image registration, said apparatus having a projection screen appurtenant thereto, comprising:
   illumination means for providing an optical illumination beam;
   beam separation means for dividing said illumination beam into red, green and blue light valve read-out beams;
   light valve means including first, second and third light valves in optical alignment with said red, green and blue read-out beams, respectively, for providing red, green and blue image and alignment beams upon illumination by said red, green and blue read-out beams, wherein said red, green and blue image beams are spatially positioned relative to said red, green and blue alignment beams, respectively, in a predetermined manner;
   a projection lens for projecting said red, green and blue image beams onto said projection screen;
   photodetector means for generating first, second and third control signals in response to the position of said red, green and blue alignment beams, respectively; and
   light valve control circuit means for optically aligning said red, green and blue image beams with said projection lens in response to said control signals.

10. The projection apparatus of claim 9 wherein said light valve means includes red, green and blue channel cathode ray tubes coupled to said first, second and third light valves.

11. The projection apparatus of claim 10 wherein said beam separation means includes red and blue reflector filters for deflecting said red and blue read-out beams to said first and second light valves, respectively.

12. The projection apparatus of claim 9 further including a reflective fold mirror for directing said red, green and blue image beams to said projection lens, said fold mirror.

13. The projection apparatus of claim 9 wherein said photodetector means includes first second and third photodetectors, and wherein said projection system further includes a substantially reflective fold mirror for reflecting first portions of each of said image and alignment beams to said projection lens, and for transmitting second portions of said red, green and blue alignment beams to said first, second and third photodetectors, respectively.

14. A full-color light valve projection apparatus with internal image registration, said apparatus having a projection screen appurtenant thereto, comprising:

tricolor light valve means for providing red, green and blue image beams and sequentially generating red, green and blue alignment beams wherein said red, green and blue image beams are spatially positioned relative to said red, green and blue alignment beams, respectively, in a predetermined manner;

projection lens means for projecting said red, green and blue image beams onto said projection screen;

photodetector means for generating a sequence of first, second and third control signals upon illumination by a sequence of said red, green and blue alignment beams, respectively; and light valve control circuit means for optically aligning said red, green and blue image beams with said projection lens in response to said sequence of control signals.

15. The projection apparatus of claim 9 wherein said photodetector means includes a photodetector, and wherein said projection system further includes a substantially reflective fold mirror for reflecting first portions of each of said image and alignment beams to said projection lens, and for transmitting second portions of said sequence of red, green and blue alignment beams to said photodetector.

16. A method of maintaining the alignment of an image beam, said beam being projected by a projection lens within a light valve projection apparatus upon a screen external thereto, comprising the steps of:

a) generating said image beam and an alignment beam, said alignment beam having a predetermined spatial relationship with said image beam;

b) generating a control signal in response to the position of said alignment beam within said apparatus; and c) optically aligning said image beam with said projection lens in response to said control signal.

17. A method for maintaining optical registration among red, green and blue image beams, each of said beams being projected by a projection lens within a light valve projection apparatus upon an external screen, comprising the steps of:

a) generating red, green and blue image beams and red, green and blue alignment beams wherein said red, green and blue image beams are spatially positioned relative to said red, green and blue alignment beams, respectively, in a predetermined manner;

b) generating first, second and third control signals in response to the position of said red, green and blue alignment beams within said apparatus, respectively; and c) optically aligning said red, green and blue image beams with said projection lens in response to said control signals.

* * * * *